Dec. 3, 1946.  W. R. CARTER  2,412,124

VOLTAGE REGULATOR

Filed April 17, 1943

Inventor

William R. Carter

By Akel C. Benson

Attorney

Patented Dec. 3, 1946

2,412,124

UNITED STATES PATENT OFFICE 2,412,124

VOLTAGE REGULATOR

William R. Carter, Minneapolis, Minn., assignor to Electric Machinery Manufacturing Company, Minneapolis, Minn.

Application April 17, 1943, Serial No. 483,395

4 Claims. (Cl. 171—312)

My invention relates to voltage regulators for sources of alternating current and particularly alternating current generators, and has for an object to provide a voltage regulator which will be extremely sensitive in operation.

Another object of the invention resides in providing a voltage regulator of the vibratory type in which the number of vibrations will be equal to twice the line frequency.

An object of the invention resides in providing a voltage regulator in which the disadvantages arising from hunting are reduced to a minimum.

A still further object of the invention resides in providing a voltage regulator in which the increase in maximum voltage over the average voltage, following an increase in load, is reduced to a minimum.

Another object of the invention resides in providing a voltage regulator in which the time required by the regulator to stabilize disturbances in the voltage is materially reduced.

An object of the invention resides in providing a relay, a control circuit for operating said relay energized by the line whose voltage is to be regulated and a regulating circuit operated by the relay and serving to regulate the voltage.

A still further object of the invention resides in providing a transformer having a high impedance winding connected to the control circuit and a low impedance winding connected to the regulating circuit.

Another object of the invention resides in energizing the low impedance winding with direct current, or pulsating unidirectional current to saturate the core thereof and in constructing the core with a section of non-magnetic material.

Other objects of the invention reside in the novel combination and arrangement of parts and in the details of construction hereinafter illustrated and/or described.

Figure 1:
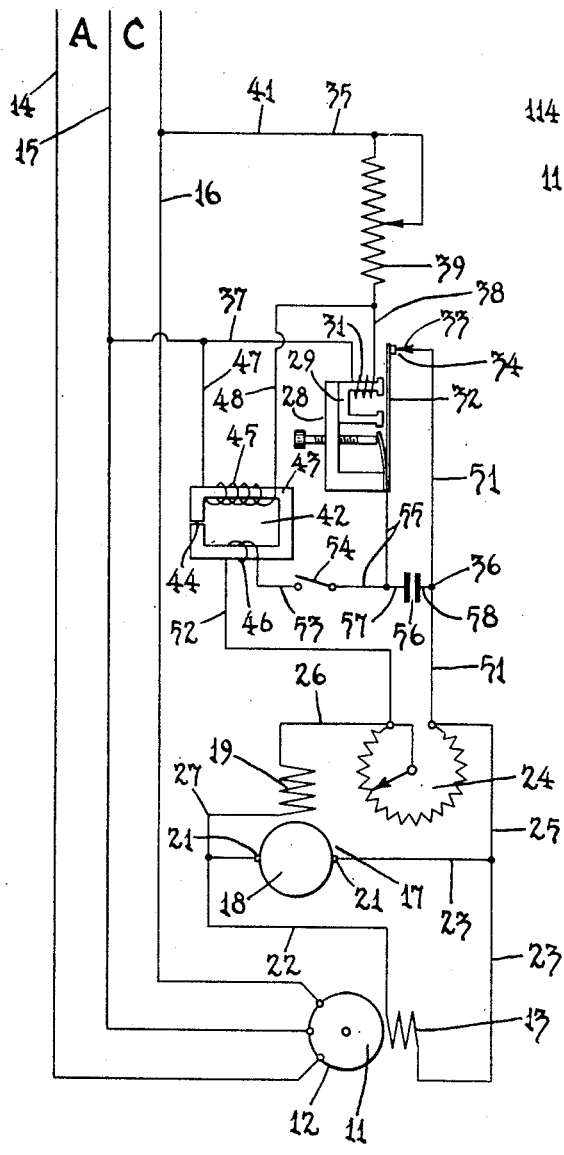
Fig. 1 is a wiring diagram of an embodiment of my invention applied to an alternating current generator.

Referring to Fig. 1 of the drawing, an alternating current generator 11 is illustrated which is provided with an armature winding 12 and a field winding 13. The armature winding 12 is connected to an alternating current line indicated by the reference characters AC comprising conductors 14, 15 and 16. The field winding 13 is energized with direct current derived from exciter 17. This exciter comprises an armature 18 and a field winding 19. The field winding 13 of generator 11 is directly connected across the brushes 21 of the armature 18 exciter 17, by means of conductors 22 and 23. An adjustable resistor 24 is employed, which is connected to the conductor 23 by means of a conductor 25 and to one side of the field winding 19 of exciter 17 by means of a conductor 26. The other side of the field winding 19 is connected by means of a conductor 27 to the conductor 22.

The invention includes a relay 28 which comprises a U-shaped core 29 having a winding 31 therein. A vibratory armature 32, adapted to be attracted by the core 29, operates in conjunction with a contact 33 to form a switch indicated in its entirety by the reference numeral 34. The relay winding 31 is connected in a control circuit indicated in its entirety by the reference numeral 35, while the switch 34 operates in a regulating circuit indicated in its entirety by the reference numeral 36.

The circuit 35 includes a conductor 37 which is connected to the conductor 15 of line AC. This conductor is further connected to one end of the winding 31 of relay 28. The said circuit further includes a conductor 38 which is connected at one end to the other end of winding 31 and at its other end to one side of an adjustable resistor or impedance 39 which I have termed the calibrating resistor and which is set to obtain the desired voltage. The other side of this resistor is connected to the conductor 16 of the line AC by means of a conductor 41.

Operating in conjunction with the relay 28 is a transformer 42. This transformer comprises a core 43 which is constructed with an air gap 44, or with a section of any other suitable non-magnetic material. On the core 43 is provided a high impedance winding 45 having a great number of turns and a low impedance winding 46 having a relatively few number of turns.

In the use of my invention, I have found that a transformer of the following design produced highly satisfactory results. This transformer had a core of approximately one square inch in cross-section and an air gap of 0.006 inch. The low impedance winding had one hundred and twenty-five turns of No. 20 gauge copper wire and the high impedance winding had two thousand five hundred turns of No. 30 gauge copper wire.

The high impedance winding of transformer 42 is connected by means of conductors 47 and 48 to the conductors 37 and 38, respectively of control circuit, whereby the winding 45 is connected in parallel with the winding 31 of relay 28. It will thus become readily apparent that both the windings 45 and 31 are connected together in parallel and in series with a resistor 39 to the line whose voltage is to be regulated. While I have shown these windings as energized directly from the line, it will readily be comprehended that the same may be indirectly energized by transformers, potentiometers, etc., connected to the line, as is now well-known in the art.

The regulating circuit 36 includes a conductor 51 which is connected to the conductor 25 and the resistor 24 and to the contact 33 of switch 34. The said circuit also includes the low impedance winding 46 of transformer 42. One side of the low impedance winding 46 is connected by means of a conductor 52 with the conductor 26 and also the resistor 24. The other side of the low impedance winding 46 is connected by means of a conductor 53 with a switch 54. A conductor 55 connects the switch 54 with the armature 32 of relay 28 which forms the other contact of the switch 34. A condenser 56 is connected across the switch 34 by means of conductors 57 and 58, which are respectively connected to the conductors 55 and 51. It will be thus readily comprehended that the low-impedance winding 46 is connected in series with the switch 34 in the regulating circuit 36 and that the said winding is energized by the pulsating current produced by the vibratory action of the switch 34.

The operation of the invention is as follows: Regulation of the voltage with my invention depends upon the length of time during each half cycle of frequency of the generator voltage, that the switch 34 remains closed and upon the time constant of the exciter field winding. With this type of device, an increase of load on the generator 11 would cause a drop in voltage on the line AC and a weakening of the magnetic pull on the core 29 of the armature 32. This would cause the armature to remain in its deenergized position and the switch closed for a longer time per cycle, since the pull on the armature would not become sufficient until the voltage had increased sufficiently to attract the same. This would increase the length of time that the resistor 24 was short-circuited, thus producing higher field current in the field winding 19 of exciter 17 for a greater length of time during each half cycle. In this manner, the voltage would be increased to compensate for the drop in voltage occasioned by the load. The transformer 42 is energized through the low impedance winding 46 from the pulsating current produced by the action of switch 34 in the regulating circuit 36. This pulsating current produces a pulsating voltage which is applied to the primary low impedance winding 46 and induces a corresponding pulsating voltage component which combines with the voltage component of the line AC across the secondary winding 45 of transformer 42 to produce a resultant modified voltage which is impressed upon the winding 31 of relay 28. This modified voltage operates to increase the portion of the cycle during which the switch 34 is open when the excitation current rises above normal, and operates to decrease the portion of the cycle that switch 34 is open when the excitation current decreases below normal, thus controlling the generator excitation current to cause the line voltage to more quickly return to its normal value with the minimum number of voltage oscillations, thereby quickly stabilizing the voltage to its normal value.

Figure 2:
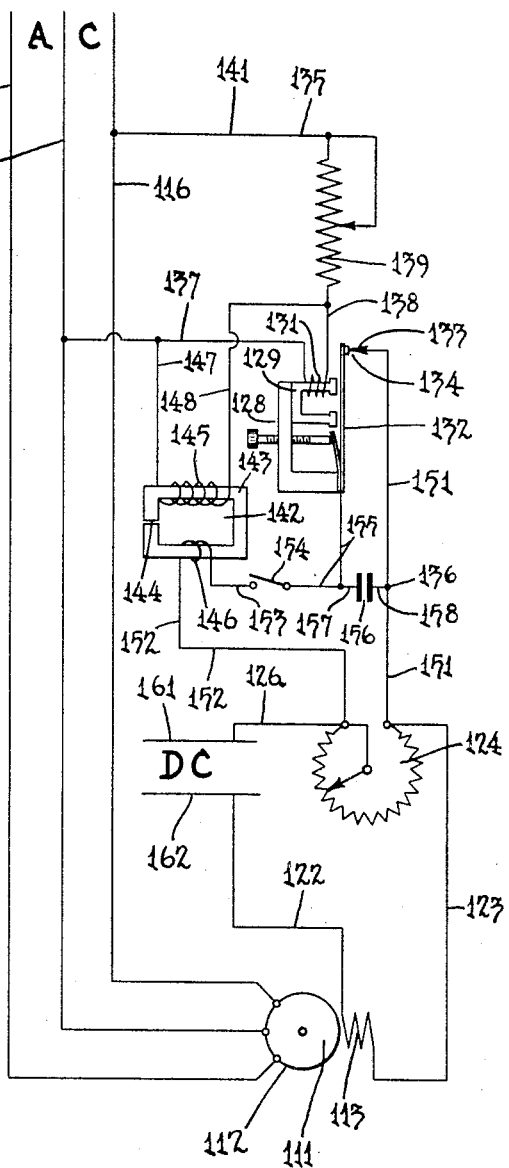
Fig. 2 is a wiring diagram of a modification of my invention.

In Fig. 2 of the drawing, I have shown a modification of the invention. The device there shown differs only from that shown in Fig. 1 in that the voltage is regulated by varying the generator field excitation current instead of varying the shunt field current of the exciter. Due to the similarity of the construction of both devices, the description of the similar parts will not be repeated and the same reference numerals, preceded by the digit "1," will be used to indicate corresponding parts in Fig. 2. In Fig. 2, the resistor 124 is connected by a conductor 126 to one side 161 of a direct current line DC. The other side 162 of this line is connected by a conductor 122 to the field winding 113 of the generator 111. When the switch 134 is closed, the resistor 124 is shorted and the full line voltage of the line DC is impressed upon the field winding 113. When the switch 134 is open, the resistor 124 is connected in series with the field winding 113 and the current flowing through the same is reduced. In this manner, the voltage of the generator 111 is controlled in much the same manner as in the other form of the invention.

The advantages of my invention are manifest. The invention is extremely simple in construction and inexpensive. My device operates twice for each cycle, thereby being more sensitive than devices operating only once for each cycle. Due to generator field excitation being increased by reason of the transformer employed, normal voltage is rapidly restored. With my invention, a smaller ohmic resistor can be used for regulating the generator voltage. The voltage of the generator may be accurately and easily varied by adjustment of the calibrating resistance. I have discovered that hunting of the generator voltage is materially reduced, both as to amplitude and duration, due to the action of the transformer on the voltage regulator relay.

Changes in the specific form of my invention, as herein described, may be made within the scope of what is claimed without departing from the spirit of my invention.

Having described my invention, what I claim as new and desire to protect by Letters Patent is:

1. A voltage regulator for an alternating-current generator having a field winding, said regulator including a relay having a core, a winding thereon, a vibratory armature and a switch operated by said armature, a transformer having a core with two windings thereon, a regulating circuit for regulating the generator field current and including said switch, one of the windings of said transformer being connected in said regulating circuit in series with said switch, and a control circuit energized by the generator voltage and by the induced voltage in the other winding of the transformer, said control circuit energizing the winding of said relay.

2. A voltage regulator for an alternating-current generator having a field winding, said regulator including a relay having a core, a winding thereon, a vibratory armature and a switch operated by said armature, a transformer having a core with two windings thereon, a regulating circuit for regulating the generator field current and including said switch, one of the windings of said transformer being connected to said regulating circuit and being responsive to the current passing through said switch, and a control circuit connected to the generator, the other winding of said transformer and the relay winding being connected in said control circuit in parallel with one another and an impedance in said control circuit connected in series with both of said windings.

3. A voltage regulator for an alternating-current generator having a field winding, said regulator including a relay having a core, a winding thereon, a vibratory armature and a switch operated by said armature, a transformer having a core with two windings thereon, a regulating circuit for regulating the generator field current and including said switch, one of the windings of said transformer being connected in said regulating circuit in series with said switch, a control circuit connected to the generator, the other winding of said transformer and the relay winding being connected in said control circuit in parallel with one another, and a resistor in said control circuit connected in series with both of said windings.

4. A voltage regulator for an alternating-current generator having a field winding energized by direct current and a rheostat in series therewith, said regulator including a relay having a core, a winding thereon, a vibratory armature and a switch operated by said armature, a transformer having a core with two windings thereon, a regulating circuit for regulating the generator field current and including said switch and rheostat, one of the windings of said transformer being connected in said regulating circuit in series with said switch, and a control circuit energized by the generator voltage and by the induced voltage in the other winding of the transformer, said control circuit energizing the winding of said relay.

WILLIAM R. CARTER.